(12) United States Patent
Stenger et al.

(10) Patent No.: US 8,574,527 B2
(45) Date of Patent: Nov. 5, 2013

(54) PROCESS FOR AFTERTREATING CARBON BLACK

(75) Inventors: Frank Stenger, Alzenau (DE); Klaus Bergemann, Kerpen-Sindorf (DE); Manfred Nagel, Maintal (DE)

(73) Assignee: Evonik Carbon Black GmbH, Hanau (DE)

( * ) Notice: Subject to any disclaimer, the term of this patent is extended or adjusted under 35 U.S.C. 154(b) by 1074 days.

(21) Appl. No.: 12/149,169

(22) Filed: Apr. 28, 2008

(65) Prior Publication Data

US 2009/0155157 A1    Jun. 18, 2009

Related U.S. Application Data

(60) Provisional application No. 61/006,029, filed on Dec. 14, 2007.

(30) Foreign Application Priority Data

Dec. 12, 2007   (DE) .................. 10 2007 060 307

(51) Int. Cl.
| | |
|---|---|
| C22B 26/10 | (2006.01) |
| C01B 31/00 | (2006.01) |
| B32B 9/00 | (2006.01) |
| B32B 19/00 | (2006.01) |
| B29B 9/00 | (2006.01) |
| B60C 1/00 | (2006.01) |
| C08G 73/10 | (2006.01) |

(52) U.S. Cl.
USPC ........ 423/345; 423/449.2; 423/414; 428/408; 428/688; 264/7; 524/495; 524/392

(58) Field of Classification Search
None
See application file for complete search history.

(56) References Cited

U.S. PATENT DOCUMENTS

| | | |
|---|---|---|
| 3,133,893 A | 5/1964 | Newmann |
| 3,314,814 A | 4/1967 | Newman |
| 3,519,452 A | 7/1970 | Rivin |
| 3,660,133 A | 5/1972 | Van Der Schuyt et al. |
| 3,705,043 A | 12/1972 | Zabiak |
| 3,749,670 A | 7/1973 | Ormsbee et al. |
| 3,841,888 A | 10/1974 | Belde et al. |
| 3,903,034 A | 9/1975 | Zabiak et al. |
| 3,946,138 A | 3/1976 | Jones |

(Continued)

FOREIGN PATENT DOCUMENTS

| | | |
|---|---|---|
| CA | 2207414 | 6/1996 |
| CA | 2 740 672 A1 | 4/2010 |

(Continued)

OTHER PUBLICATIONS

International Search Report for PCT/EP2008/065831 filed Nov. 19, 2008.

(Continued)

Primary Examiner — Guinever Gregorio
(74) Attorney, Agent, or Firm — Law Office of: Michael A. Sanzo, LLC

(57) ABSTRACT

The invention relates to a process for aftertreating carbon black, wherein the carbon black is subjected to a carrier gas flow in a fluidized bed apparatus in the lower region of the apparatus, an additional gas stream is introduced into the fluidized bed apparatus, and the carbon black is aftertreated in the fluidized bed which arises.

19 Claims, 2 Drawing Sheets

(56) References Cited

U.S. PATENT DOCUMENTS

| | | |
|---|---|---|
| 3,978,019 A | 8/1976 | Oelmann |
| 3,998,652 A | 12/1976 | Aign et al. |
| 4,055,439 A | 10/1977 | Babler |
| 4,075,160 A | 2/1978 | Mills |
| 4,076,527 A | 2/1978 | Nealy |
| 4,366,139 A | 12/1982 | Kuhner et al. |
| 4,368,582 A | 1/1983 | Graser |
| 4,435,377 A | 3/1984 | Rothbuhr |
| 4,435,378 A | 3/1984 | Reck |
| 4,486,033 A | 12/1984 | Parrotta |
| 4,536,776 A | 8/1985 | Knirsch et al. |
| 4,698,913 A * | 10/1987 | Voll ............................ 34/370 |
| 4,755,358 A * | 7/1988 | Voll et al. ..................... 422/106 |
| 4,836,852 A | 6/1989 | Knirsch |
| 4,879,335 A | 11/1989 | Hirota et al. |
| 4,909,853 A | 3/1990 | Wienkenhover |
| 4,963,616 A | 10/1990 | Jenekhe |
| 5,021,291 A | 6/1991 | Kobayashi et al. |
| 5,085,698 A | 2/1992 | Ma et al. |
| 5,164,232 A | 11/1992 | Henseleit |
| 5,236,992 A | 8/1993 | Bush |
| 5,320,668 A | 6/1994 | Shields et al. |
| 5,430,088 A | 7/1995 | Ohashi et al. |
| 5,531,818 A | 7/1996 | Lin et al. |
| 5,554,739 A | 9/1996 | Belmont |
| 5,609,671 A | 3/1997 | Nagasawa |
| 5,620,743 A | 4/1997 | Harth |
| 5,639,817 A | 6/1997 | Probst |
| 5,672,198 A | 9/1997 | Belmont |
| 5,713,988 A | 2/1998 | Belmont et al. |
| 5,760,112 A | 6/1998 | Hirota et al. |
| 5,772,975 A | 6/1998 | Mise et al. |
| 5,837,044 A | 11/1998 | Santilli |
| 5,851,280 A | 12/1998 | Belmont et al. |
| 5,859,120 A | 1/1999 | Karl |
| 5,900,029 A | 5/1999 | Belmont |
| 5,922,118 A | 7/1999 | Johnson et al. |
| 5,929,134 A | 7/1999 | Lent et al. |
| 5,977,209 A | 11/1999 | Breton et al. |
| 6,056,933 A | 5/2000 | Vogler et al. |
| 6,063,182 A | 5/2000 | Babler |
| 6,099,818 A | 8/2000 | Freund |
| 6,132,505 A | 10/2000 | Linde |
| 6,136,286 A | 10/2000 | Okuyama |
| 6,171,382 B1 | 1/2001 | Stubbe et al. |
| 6,212,794 B1 | 4/2001 | Zhu |
| 6,221,142 B1 | 4/2001 | Wang et al. |
| 6,224,735 B1 | 5/2001 | Akutsu et al. |
| 6,228,928 B1 | 5/2001 | Soeda |
| 6,242,382 B1 | 6/2001 | Bratz |
| 6,251,983 B1 | 6/2001 | Vogler et al. |
| 6,290,767 B1 | 9/2001 | Bergemann et al. |
| 6,312,513 B1 | 11/2001 | Hoefer |
| 6,337,302 B1 | 1/2002 | Teng |
| 6,358,487 B1 | 3/2002 | Omae et al. |
| 6,387,168 B1 | 5/2002 | Koitabashi |
| 6,403,695 B1 | 6/2002 | Soeda et al. |
| 6,451,100 B1 | 9/2002 | Karl |
| 6,471,763 B1 | 10/2002 | Karl |
| 6,491,976 B2 | 12/2002 | Horiuchi |
| 6,503,311 B1 | 1/2003 | Karl et al. |
| 6,569,231 B1 | 5/2003 | Mathias |
| 6,582,505 B1 | 6/2003 | Bouvy |
| 6,646,023 B1 | 11/2003 | Nyssen |
| 6,660,075 B2 | 12/2003 | Bergemann |
| 6,685,769 B1 | 2/2004 | Karl |
| 6,715,420 B2 | 4/2004 | Blake et al. |
| 6,758,891 B2 | 7/2004 | Bergemann et al. |
| 6,780,389 B2 | 8/2004 | Karl et al. |
| 6,783,836 B2 | 8/2004 | Bennett et al. |
| 6,821,334 B2 | 11/2004 | Nakamura |
| 6,858,569 B2 | 2/2005 | Yokota et al. |
| 6,956,006 B1 | 10/2005 | Mirsky et al. |
| 6,960,250 B2 | 11/2005 | Luthge et al. |
| 7,005,004 B2 | 2/2006 | Kalbitz |
| 7,160,377 B2 | 1/2007 | Zoch |
| 7,172,652 B2 | 2/2007 | Zoch |
| 7,217,405 B2 | 5/2007 | Karl |
| 7,300,964 B2 | 11/2007 | Niedermeier et al. |
| 7,435,857 B2 | 10/2008 | Poellmann |
| 8,236,274 B2 | 8/2012 | Quitmann et al. |
| 2001/0036994 A1 | 11/2001 | Bergemann |
| 2002/0041317 A1 | 4/2002 | Kashiwazaki et al. |
| 2003/0000409 A1 | 1/2003 | Blake et al. |
| 2003/0013797 A1 | 1/2003 | Thielen |
| 2003/0101901 A1 | 6/2003 | Bergemann et al. |
| 2003/0114350 A1 | 6/2003 | Schmitt |
| 2003/0134938 A1 | 7/2003 | Nakamura |
| 2003/0180210 A1* | 9/2003 | Karl ............................ 423/449.2 |
| 2004/0087707 A1 | 5/2004 | Zoch |
| 2004/0123773 A1 | 7/2004 | Butler et al. |
| 2004/0202603 A1 | 10/2004 | Fischer et al. |
| 2004/0248731 A1 | 12/2004 | Vogel et al. |
| 2005/0014864 A1 | 1/2005 | Akers et al. |
| 2005/0062205 A1 | 3/2005 | Zak |
| 2005/0090609 A1 | 4/2005 | Reisacher |
| 2006/0086834 A1 | 4/2006 | Pfeffer |
| 2006/0230550 A1 | 10/2006 | Hees |
| 2006/0243165 A1 | 11/2006 | Lüthge |
| 2007/0031319 A1 | 2/2007 | Lüthge |
| 2007/0043157 A1 | 2/2007 | Riebel |
| 2007/0044682 A1 | 3/2007 | Nick et al. |
| 2007/0076068 A1 | 4/2007 | Guo et al. |
| 2007/0076071 A1 | 4/2007 | Iu et al. |
| 2008/0110552 A1 | 5/2008 | Arnold |
| 2008/0214730 A1 | 9/2008 | Henry |
| 2008/0219915 A1 | 9/2008 | Quitmann |
| 2009/0035210 A1 | 2/2009 | Krauss |
| 2009/0305011 A1 | 12/2009 | McIntosh |
| 2010/0147187 A1 | 6/2010 | Tauber |
| 2010/0180794 A1 | 7/2010 | Tauber |
| 2010/0248120 A1 | 9/2010 | Riebel |
| 2011/0034611 A1 | 2/2011 | Pelster et al. |
| 2011/0207872 A1 | 8/2011 | Schinkel |
| 2011/0232531 A1 | 9/2011 | Götz |

FOREIGN PATENT DOCUMENTS

| | | |
|---|---|---|
| CN | 1858531 A | 11/2006 |
| DE | 203 711 C | 10/1908 |
| DE | 25 40 355 A1 | 3/1976 |
| DE | 3041188 A1 | 6/1982 |
| DE | 36 15 571 A1 | 11/1987 |
| DE | 43 08 488 A1 | 9/1994 |
| DE | 195 21 565 A1 | 1/1997 |
| DE | 196 13 796 A1 | 10/1997 |
| DE | 197 31 572 A1 | 1/1999 |
| DE | 197 48 575 A1 | 5/1999 |
| DE | 198 39 925 A1 | 10/1999 |
| DE | 198 24 947 | 12/1999 |
| DE | 199 34 282 A1 | 1/2001 |
| DE | 100 12 784 | 9/2001 |
| DE | 101 49 805 | 4/2003 |
| DE | 10242875 A1 | 5/2003 |
| DE | 102 38 149 | 2/2004 |
| DE | 10 2004 058 271 A1 | 6/2006 |
| DE | 10 2007 026 214 A1 | 12/2008 |
| DE | 10 2007 026 551 A1 | 12/2008 |
| EP | 0 036 520 A2 | 9/1981 |
| EP | 0 176 707 A1 | 4/1986 |
| EP | 0 259 130 A2 | 3/1988 |
| EP | 0 263 412 | 4/1988 |
| EP | 0 282 855 A2 | 9/1988 |
| EP | 0 608 892 | 8/1994 |
| EP | 0655516 | 5/1995 |
| EP | 0 792 920 | 9/1997 |
| EP | 0 803 780 A1 | 10/1997 |
| EP | 0 857 764 A2 | 8/1998 |
| EP | 0 969 052 A1 | 1/2000 |
| EP | 0 982 378 | 3/2000 |
| EP | 1 061 106 A1 | 12/2000 |
| EP | 1 061 107 A1 | 12/2000 |
| EP | 1 103 173 A1 | 5/2001 |
| EP | 1134261 | 9/2001 |

(56) References Cited

FOREIGN PATENT DOCUMENTS

| | | |
|---|---|---|
| EP | 1 167 470 A1 | 1/2002 |
| EP | 1347018 A1 | 9/2003 |
| EP | 1 783 178 | 5/2007 |
| FR | 1 233 251 | 10/1960 |
| GB | 895990 | 5/1962 |
| JP | 1-272645 | 10/1989 |
| JP | 3-124772 | 5/1991 |
| JP | 4-18438 | 1/1992 |
| JP | 5-78110 | 3/1993 |
| JP | 6-228371 | 8/1994 |
| JP | 6-279624 | 10/1994 |
| JP | 7-258578 | 10/1995 |
| JP | 7-268148 | 10/1995 |
| JP | 08-015895 | 1/1996 |
| JP | 9-67528 | 3/1997 |
| JP | 9-124312 | 5/1997 |
| JP | 9-235485 | 9/1997 |
| JP | 10-140033 | 5/1998 |
| JP | 11-012487 | 1/1999 |
| JP | 11-092686 A | 4/1999 |
| JP | 11-158425 | 6/1999 |
| JP | 11-189735 | 7/1999 |
| JP | 11-189736 | 7/1999 |
| JP | 11-302557 | 11/1999 |
| JP | 11-315220 | 11/1999 |
| JP | 11-349309 | 12/1999 |
| JP | 2000-212468 | 8/2000 |
| JP | 2000-248118 | 9/2000 |
| JP | 2000-248194 | 9/2000 |
| JP | 2000-248196 | 9/2000 |
| JP | 2000-248197 | 9/2000 |
| JP | 2000-290529 | 10/2000 |
| JP | 2001-40240 | 2/2001 |
| JP | 2001-214068 | 8/2001 |
| JP | 2001-240768 | 9/2001 |
| JP | 2001-254033 | 9/2001 |
| JP | 2001-329205 | 11/2001 |
| JP | 2002-080758 | 3/2002 |
| JP | 2003-049101 | 2/2003 |
| JP | 2003-201418 A | 7/2003 |
| JP | 2004-067903 | 3/2004 |
| JP | 2004-75985 | 3/2004 |
| JP | 2004-224948 | 8/2004 |
| JP | 2006-008899 | 1/2006 |
| JP | 2006-022270 | 1/2006 |
| JP | 2006-052413 | 2/2006 |
| JP | 2006-126387 | 5/2006 |
| SU | 532612 | 2/1977 |
| SU | 887587 | 12/1981 |
| WO | WO 92/04415 | 3/1992 |
| WO | WO 92/13983 | 8/1992 |
| WO | WO 95/23038 | 8/1995 |
| WO | WO 96/18688 | 6/1996 |
| WO | WO 96/18690 | 6/1996 |
| WO | WO 96/18694 A2 | 6/1996 |
| WO | WO 97/32571 A1 | 9/1997 |
| WO | WO 98/42192 | 10/1998 |
| WO | WO 98/42778 | 10/1998 |
| WO | WO 98/45361 | 10/1998 |
| WO | WO 99/58617 | 11/1999 |
| WO | WO 00/09254 | 2/2000 |
| WO | WO 00/77104 | 12/2000 |
| WO | WO 01/55050 | 8/2001 |
| WO | WO 03/014238 A1 | 2/2003 |
| WO | WO 03/055959 A1 | 7/2003 |
| WO | WO 03/064540 A1 | 8/2003 |
| WO | WO 2004/046256 A1 | 6/2004 |
| WO | WO 2005/017047 A1 | 2/2005 |
| WO | WO 2005/022667 A2 | 3/2005 |
| WO | WO/2005/028978 A1 | 3/2005 |
| WO | WO 2006/061110 A1 | 6/2006 |
| WO | WO 2006/066132 A2 | 6/2006 |
| WO | WO 2007/027625 A2 | 3/2007 |
| WO | WO 2007/039604 A2 | 4/2007 |
| WO | WO 2008/148639 A2 | 12/2008 |
| WO | WO 2010/043562 A1 | 4/2010 |

OTHER PUBLICATIONS

Written Opinion of the International Searching Authority for PCT/EP2008/065831 filed Nov. 19, 2008.
Franklin, et al., "An Enhanced CVD Approach to Extensive Nanotube Networks with Directionality," *Advanced Materials* 12:890-894 (2000).
McMillan, et al., "High Velocity Attrition Nozzles in Fluidized Beds," *Powder Technology* 175:133-141 (2007).
Wang, et al., "Using Pulsed Flow to Overcome Defluidization," *Chemical Engineering Science* 60:5177-5181 (2005).
English language abstract for CN 1858531 A.
English language abstract for WO 2008/148641 counterpart to DE 10 2007 026 214 A1.
English language abstract for JP 3-124772.
English language abstract for JP 5-78110.
English language abstract for JP 9-67528.
English language abstract for JP 9-124312.
English language abstract for JP 2000-248118.
English language abstract for JP 2000-248196.
English language abstract for JP 2000-290529.
English language abstract for JP 2001-40240.
English language abstract for JP 2004-75985.
English language abstract for DE 36 15 571.
English language abstract for DE 198 24 947.
English language abstract for JP 08-015895.
English language abstract for JP 11-158425.
English language translation for JP 11-189735.
English language abstract for JP 11-189736.
English language Abstract for JP 11-315220.
English language abstract for JP 2000-212468.
English language abstract for JP 2000-248197.
English language abstract for JP 2000-248194.
English language abstract for JP 2001-254033.
English language abstract for JP 2001-329205.
English language abstract for JP 2006-008899.
English language abstract for SU 532612.
English language abstract for SU 887587.
English language abstract for WO 92/13983.
English language abstract for WO 01/55050.
Ohkita, et al., "The Competitive Reactions of Initiator Fragments and Growing Polymer Chains Against the Surface of Carbon Black," *Carbon* vol. 16:41-45 (1978).
English Translation of IPER for PCT/EP2008/065831, filed Nov. 19, 2008.
English Translation of Written Opinion for PCT/EP2008/065831, filed Nov. 19, 2008.
English language abstract for JP 2002-080758, 2012.
Machine translation of JP 2002-080758, 2012.
English language abstract for JP 2003-049101, 2012.
Machine translation of JP 2003-049101, 2012.
English language abstract for JP 2004-067903, 2012.
Machine translation of JP 2004-067903, 2012.
U.S. Appl. No. 13/031,694, filed Feb. 22, 2011, Schinkel.
English language abstract for DE197 31 572 A1.
English language abstract for DE 10 2004 058 271 A1.
English language translation of summary for FR 1 233 251.
English language abstract for WO 03/055959 A1.
English language abstract for WO 2010/043562 A1.
*Chemielexikon Römpp*; Römpp Online-ID=RD-07-00259, Gas Black; http://www.roempp.com/prod/roemp.php.
"Improved Test for Determination of Carbon Black Structure" presented by Wesley Wampler; Carbon Black World 2004; Nov. 15, 2004; XP002637916.
U.S. Appl. No. 13/131,372, filed May 26, 2010, Götz.
English language abstract for JP 6-228371.
Machine translation of JP 6-228371.
English language abstract for JP 6-279624.
English language abstract for JP 9-235485.

(56) References Cited

OTHER PUBLICATIONS

English language abstract for JP 10-140033.
English language abstract for JP 11-012487.
Machine translation of JP 11-012487.
English language abstract for JP 11-092686.
Machine translation of JP 11-092686.
English language abstract for JP 11-349309.
Machine translation of JP 11-349309.
English language abstract for JP 2001-240768.
Machine translation of JP 2001-240768.
English language abstract for JP 2003-201418.
English language abstract for JP 2006-022270.
Machine translation of JP2006-022270.
English language abstract for JP 2001-214068.
Machine translation of JP2001-214068.
U.S. Appl. No. 13/538,861, filed Jun. 29, 2012, Quitmann, et al.
Gerhartz, et al., "Gas Black and Channel Black," *Ulmann's Encyclopedia of Industrial Chemistry* A5:148-150; XP-002465931.
Gerspacher, M., "Dynamic Viscoelastic Properties of Loaded Elastomers," Chapter 11 Carbon Black, Donnet, et al. eds., Marcel Dekker Inc., New York, ed. 2 (1993) pp. 377-387.
Funt, et al., "Carbon Black in Plastics," Chapter 12 Carbon Black, Donnet, et al. eds., Marcel Dekker Inc., New York, ed. 2 (1993) p. 389-408.
English language abstract for Japanese patent reference JP 1-272645.
English language abstract for Japanese patent reference JP 4-18438.
English language abstract for Japanese patent reference Jp 7-268148.
English language abstract for Japanese patent reference JP 11-302557.
English language translation of text of German patent reference DE 203 711 C.
English language abstract for DE 100 12 784, 2012.
English language abstract for DE 101 49 805, 2012.
English language abstract for DE 102 38 149, 2012.
English language abstract for JP 2004-224948, 2012.
English language abstract for JP 2006-052413, 2012.
English language abstract for JP-2006-126387, 2012.
English language abstract for JP 10-510861, 2012.
English language abstract for RU 2173327, 2012.
English language abstract for RU 2200562, 2012.
English language abstract for RU 2211230, 2012.
English language abstract for DE 100 12 784 listed as document B2 above, *wherein B2 was published on Sep. 27, 2001*.
English language abstract for DE 101 49 805 listed as document B3 above, *wherein B3 was published on Apr. 24, 2003*.
English language abstract for DE 102 38 149 listed as document B4 above, *wherein B4 was published on Feb. 26, 2004*.
English language abstract for JP 2004-224948 listed as document B5 above, *wherein B5 was published on Aug. 12, 2004*.
English language abstract for JP 2006-052413 listed as document B6 above, *wherein B6 was published on Feb. 23, 2006*.
English language abstract for JP-2006-126387 listed as document B7 above, *wherein B7 was published on May 18, 2006*.
English language abstract for JP 10-510861, *wherein the JP reference was published on Oct. 20 1998*.
English language abstract for RU 2173327, *wherein the RU reference was published on Sep. 10, 2001*.
English language abstract for RU 2200562, *wherein the RU reference was published on Mar. 20, 2003*.
English language abstract for RU 2211230, *wherein the RU reference was published on Aug. 27, 2003*.
Machine translation of JP 2004-224948 listed as document B5 above, *wherein B5 was published Aug. 12, 2004*.
Machine translation of JP 2006-052413 listed as document B6 above, wherein B6 was published on Feb. 23, 2006.
Machine translation of JP-2006-126387 listed as document B7 above, *wherein B7 was published on May 18, 2006*.

\* cited by examiner

US 8,574,527 B2

PROCESS FOR AFTERTREATING CARBON BLACK

CROSS REFERENCE TO RELATED APPLICATIONS

The present application claims priority to, and the benefit of, U.S. provisional application 61/006,029, filed on Dec. 14, 2007 and to German application 10 2007 060 307.1, filed on Dec. 12, 2007. The contents of these prior applications are hereby incorporated by reference in their entirety.

FIELD OF THE INVENTION

The invention relates to a process for aftertreating carbon black.

BACKGROUND OF THE INVENTION

Industrial carbon blacks can be used in vehicle tires, industrial rubber articles, paints, toners, printing inks, plastics, other inks and in many other fields. Especially in the case of use of carbon black as a pigment, an aftertreatment of the carbon black improves particular features.

An aftertreatment of the carbon black may comprise, for example, an oxidation (JP 2000248196), coverage of the surface with chemical groups (JP 09067528, DE 10242875, EP 655516 B1, JP 09124312), drying (CN 1858531), an extraction (DE 3118907, JP 2000-290529), an activation by means of temperature or reactive gases (TW 394749 B, WO 2005/028978), a CVD process (Adv. Mater. 12(3) (2000) 16-20), mixing with other powders, grinding (DE 200700373) and the like.

Carbon black can be aftertreated in a wide variety of different apparatus and by a wide variety of different methods. For example, the aftertreatment can be effected by reaction of the carbon black with a liquid, (EP 982379, JP 2000248118), a solid (EP 1134261 A2) or a gas (JP 05078110 A).

The aftertreatment can be integrated into the preparation process by virtue of reactive substances being introduced into the filters, the transport pathways (JP 2000248196) or the pelletization (U.S. Pat. No. 4,075,160).

The aftertreatment can also be effected in separate apparatus.

One method of aftertreating carbon black is the use of fluidized beds (GB 895990). The fluidized bed enables, for example, very intensive contact of the carbon black with gaseous components, can additionally be cooled or heated, is mixed intensively and can be operated either batchwise or continuously.

The generation of fluidized beds with carbon black is restricted to carbon blacks which can be fluidized readily owing to their specific properties, for example bulk density, surface area, structure or primary particle size.

Many furnace blacks, and particularly furnace blacks in the form of coarse particles, do not form stable fluidized beds. For example, they often form channels through which the carrier gas flows. Therefore, other technologies for aftertreatment are often used for furnace blacks (JP 07-258578, JP 2001-040240), including reaction in a reactor with preceding grinding (JP 2004-075985).

EP 1347018 discloses a process for preparing aftertreated carbon black wherein the carbon black is fluidized in a fluidized bed with addition of fluidizing agents and contacted with an aftertreatment agent.

Moreover, DE 3041188 discloses stirring a carbon black bed while the carbon black is treated with gases.

It is also known that the fluidization of particles can be improved by vibration (JP 03124772) or external fields (WO 2005022667).

It is known that the fluidization can be improved by adding gases with a particularly low molecular weight (WO 00/009254).

Moreover, it is known that fluidization problems can be overcome in some cases by means of pulsation of the gas stream (Wang, Chemical Engineering Science 60 (2005) 5177-5181).

Furthermore, WO 2005/028978 discloses a fluidized bed in which a gas stream is passed into the fluidized bed horizontally in order to sufficiently fluidize fine particles.

Moreover, it is known that the incorporation and operation of horizontal (in relation to the fluidization flow) high-speed nozzles can destroy agglomerates in a fluidized bed and comminute particles (McMillan, Powder Technology, 175 (2007), 133-141).

It is known that nanoparticles in the fluidized state can be coated or reacted when the fluidization of the nanoparticles having aggregate sizes in the range of 50-1000 µm has been enabled beforehand by means of external fields (WO 05/022667).

A disadvantage of the known processes is the often limited possibility of aftertreating carbon black owing to inadequate fluidization, contamination of the carbon black in the case of use of an additional fluidizing agent, the technical complexity, in particular with regard to gas-tight systems when stirrers and vibration generators are used, the restricted applicability of external fields to electrically uncharged or non-magnetic particles, and in some cases the formation of undesired granules or other compactions with stirrers.

OBJECT OF THE INVENTION

It is an object of the invention to provide an aftertreatment process in which carbon blacks, including those which do not normally form a stable fluidized bed, can be converted to stable fluidized beds and be aftertreated therein without stirrers, fluidizing agents and/or external fields.

BRIEF DESCRIPTION OF THE DRAWINGS

FIG. 1 shows one possible example for the design of a fluidized bed apparatus and uses it to explain the direction of the main gas flow.

FIG. 2 shows a possible schematic setup of a fluidized bed apparatus.

DESCRIPTION OF THE INVENTION

Figure 1:
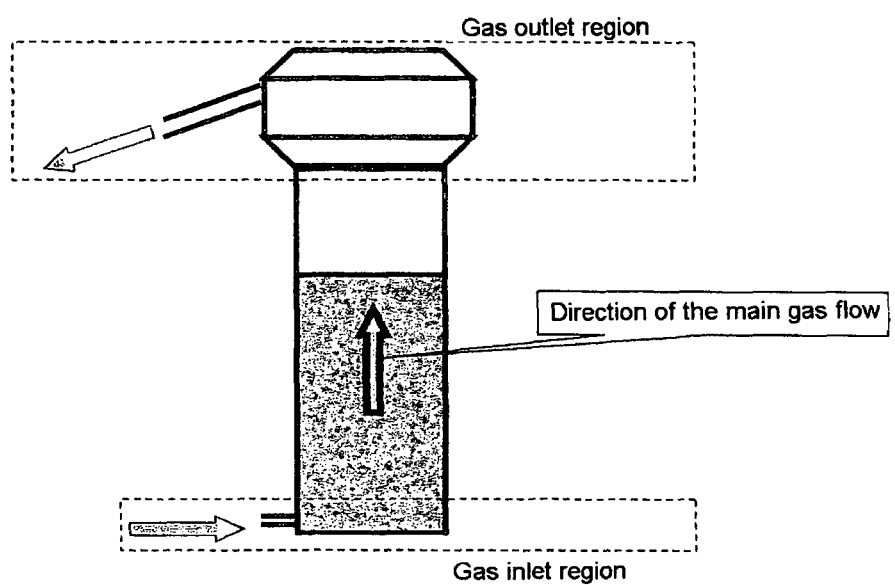
FIG. 1.
Figure 2:
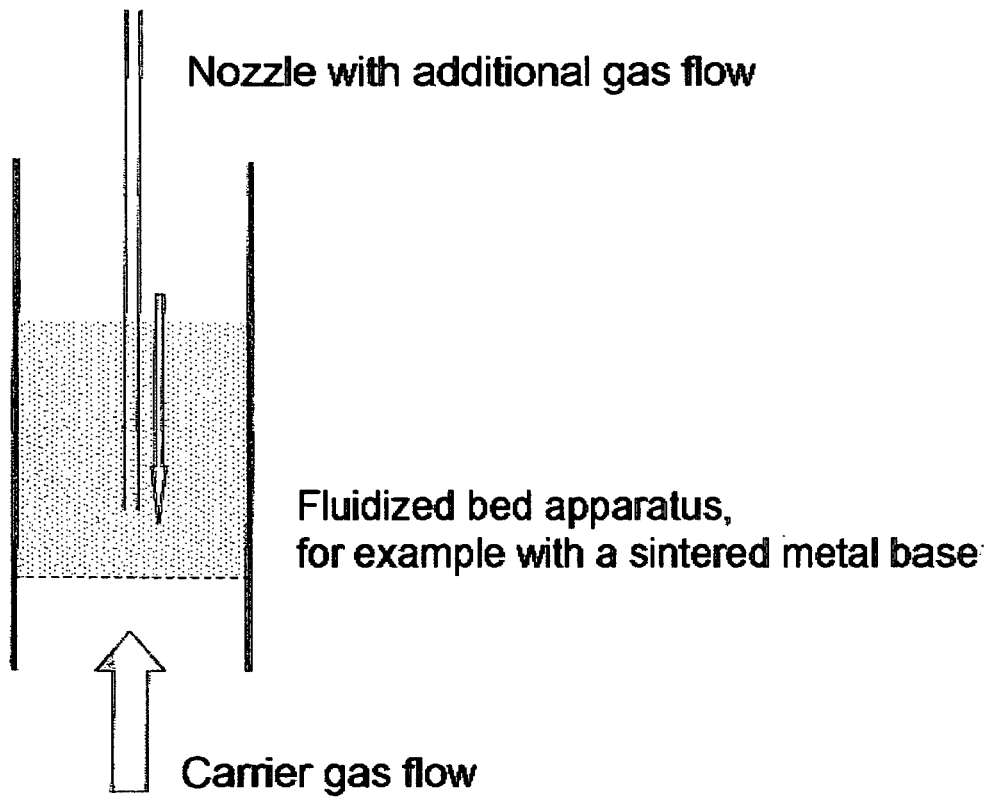
FIG. 2.

The invention provides a process for aftertreating carbon black, which is characterized in that the carbon black is subjected to a carrier gas flow in a fluidized bed apparatus in the lower region of the apparatus, an additional gas stream is introduced into the fluidized bed apparatus, and the carbon black is aftertreated in the fluidized bed which arises.

In the aftertreatment of carbon blacks in a fluidized bed, the carbon black is subjected to a carrier gas flow in the lower region of the apparatus. The fluidized beds may consist of particles which are converted to a fluid state by a gas stream, by virtue of being subjected to flows of gases and being fluidized. The lifting forces of the gas and the weight forces of the particles can preferably virtually maintain the equilibrium, such that the fluidized bed has a defined upper edge.

However, fluidized beds can also be operated such that particles discharged at the top are separated out at a filter, cyclone or another suitable apparatus and recycled into the fluidized bed. The fluidized beds may also be operated as a moving bed.

For the aftertreatment, a reactive component can be introduced into the fluidized bed.

The reactive component can be mixed with the carrier gas or else be supplied separately.

The carrier gas stream can be supplied via an appropriately gas-permeable base, for example composed of sintered metal, polymer braid, bases comprising screws or Conidur bases by means of nozzles, or by means of tangential inflow orifices in the lower region of the apparatus.

The carrier gas used may, for example, be air, nitrogen, argon or offgases from combustion processes.

The carrier gas may have a temperature of −20 to 500° C., preferably of 10 to 400° C.

According to the invention, the additional gas stream may have the same composition as or a different composition from the carrier gas.

The additional gas stream may be a gaseous reactive component, an inert gas or mixtures thereof. The inert gas used may be nitrogen, carbon dioxide or argon. The gaseous reactive component used may, for example, be hydrogen, oxygen, halogens, nitrogen oxides, silanes, formic acid, sulfur oxides and evaporated liquids. The gaseous reactive component may simultaneously serve for the aftertreatment of the carbon black.

The additional gas stream may be introduced at an angle of 91° to 180°, preferably 120° to 180°, more preferably 160° to 180°, most preferably 180°, relative to the direction of the main gas flow of the fluidized bed. The direction of the main gas flow of the fluidized bed is directed from the inlet region of the carrier gas to the outlet region.

The additional gas stream may have a temperature of −20 to 500° C., preferably of 10 to 400° C.

The additional gas stream may be 5 to 60% by volume, preferably 25-35% by volume, of the overall gas stream in the fluidized bed.

The additional gas stream introduced may be pulsed. The pulse may be semisinusoidal, rectangular or triangular. The pulse duration may be 0.1 s to 1 h, preferably 1 s to 15 min, more preferably 10 s to 1 min. The interpulse time may be 0.1 s to 1 h, preferably 1 s to 15 min, more preferably 10 s to 1 min.

The additional gas stream may be introduced centrically or eccentrically.

The additional gas stream may be introduced through nozzles. The nozzles used for the additional gas stream may be nozzles having opening angles between 0° and 140°, preferably between 0° and 90°. The diameters of the nozzle orifices used may vary between 0.05 mm and 5 mm, preferably between 0.07 mm and 1 mm, and more preferably between 0.1 mm and 0.75 mm.

The nozzles used may be single-substance or multi-substance nozzles.

The nozzles used may be full-cone, hollow-cone, flat-jet and smooth-jet nozzles.

The nozzles may be immersed into the carbon black bed to different depths. The distance of the nozzles above the base through which the carrier gas flows in may vary between 2 and 1500 mm. The distance of the nozzles above the base through which the carrier gas flows may be between 5% and 120% of the reactor diameter.

The additional gas stream introduced may be distributed between several exit points.

The additional gas stream may preferably be directed counter to the direction of the main gas flow of the fluidized bed. Both carrier gas and, in particular, the additional gas stream may also be aligned so as to give rise, for example, to a swirl, a backflow or a shearing flow.

For carbon blacks which are difficult to fluidize, the amount of the additional gas stream can be used to ensure the formation of the complete fluidized bed. Shutting down the additional gas stream can bring about a collapse of the fluidized bed.

The carbon black used may be furnace black, gas black, channel black, lamp black, thermal black, acetylene black, plasma black, inversion black known from DE 195 21 565, Si-containing black, known from WO 98/45361 or DE 19613796, or metal-containing black, known from WO 98/42778, light-arc black and blacks which are by-products of chemical production processes. The carbon black may be modified by preceding reactions.

It is possible to use carbon blacks which are used as reinforcing filler in rubber mixtures.

It is possible to use pigment blacks.

Further carbon blacks may be: conductive carbon black, carbon black for UV stabilization, carbon black as a filler in systems other than rubber, for example in bitumen, polymers, carbon black as a reducing agent, in metallurgy.

The carbon black used may preferably be a furnace black or gas black; to a particular degree, a furnace black is preferably used for the invention.

The carbon black may have a DBP value (ASTM D 2414) between 30 and 425 ml/100 g, preferably between 35 and 250 ml/100 g, more preferably between 40 and 150 ml/100 g, most preferably between 45 and 110 ml/100 g. The carbon black may have a BET surface area (ASTM D 4820) between 20 and 1200 $m^2/g$, preferably between 22 and 600 $m^2/g$, more preferably between 29 and 300 $m^2/g$, most preferably between 30 and 150 $m^2/g$. The carbon black may have a mean aggregate size of 20 nm to 200 nm, preferably of 22 nm to 620 nm, more preferably of 40 nm to 300 nm.

The aggregate sizes are determined in the course of a measurement of the aggregate size distribution. The aggregate size distribution is determined by the standard ISO 15825, first edition, 2004-11-01, employing the following modifications:

Supplementation in paragraph 4.6.3 of Standard ISO 15825: the mode relates to the mass distribution curve.

Supplementation in paragraph 5.1 of Standard ISO 15825: the BI-DCP particle sizer instrument and the accompanying evaluation software dcplw32, version 3.81, are used, all obtainable from Brookhaven Instruments Corporation, 750 Blue Point Rd., Holtsville, N.Y., 11742.

Supplementation to paragraph 5.2 of Standard ISO 15825: the GM2200 ultrasound control unit, the UW2200 sound converter and DH13G Sonotrode are used. Ultrasound control unit, sound converter and sonotrode are obtainable from Bandelin electronic GmbH & Co. KG, Heinrichstrasse 3-4, D-12207 Berlin. The following values are set on the ultrasound control unit: power %=50, cycle=8. This corresponds to a set nominal output of 100 watts and a set pulse of 80%.

Supplementation to paragraph 5.2.1 of Standard ISO 15825: the ultrasound time is fixed at 4.5 minutes.

Deviating from the definition given in paragraph 6.3 of Standard ISO 15825, "surfactant" is defined as follows: "surfactant" is an anionic surfactant of the Nonidet P 40 substitute type from Fluka, obtainable from Sigma-Aldrich Chemie GmbH, Industriestrasse 25, CH-9471 Buchs SG, Switzerland.

Deviating from the definition of spinning liquid given in paragraph 6.5 of Standard ISO 15825, the spinning liquid is defined as follows: to prepare the spinning liquid, 0.25 g of Nonidet P 40 substituted surfactant from Fluka (paragraph 6.3) is made up to 1000 ml with demineralized water (paragraph 6.1). Subsequently, the pH of the solution is adjusted to 9-10 with 0.1 mol/l NaOH solution. The spinning liquid may be used for at most 1 week after its preparation.

Deviating from the definition of the dispersion liquid given in paragraph 6.6 of Standard ISO 15825, the dispersion liquid is defined as follows: to prepare the dispersion liquid, 200 ml of ethanol (paragraph 6.2) and 0.5 g of Nonidet P 40 substitute surfactant from Fluka (paragraph 6.3) are made up to 1000 ml with demineralized water (paragraph 6.1). Subsequently, the pH of the solution is adjusted to 9-10 with 0.1 mol/l of NaOH solution. The dispersion liquid may be used for at most 1 week after its preparation.

For carbon blacks which are particularly difficult to disperse, deviating from the above method, 2.5 g of surfactant are used.

Supplementation to paragraph 9 of Standard ISO 15825: the value for the density of carbon black to be introduced is 1.86 g/cm$^3$. The temperature for the temperature to be introduced is determined according to paragraph 10.11. For the type of spinning liquid, the "aqueous" option is selected. This gives rise to a value of 0.997 (g/cc) for the density of the spinning liquid, and a value of 0.917 (cP) for the viscosity of the spinning liquid. The light scattering correction is effected with the options selectable in the software dcplw 32: file=carbon.prm; Mie correction.

Supplementation to paragraph 10.1 of Standard ISO 15825: the centrifugal speed is set to 11 000 rpm.

Supplementation to paragraph 10.2 of Standard ISO 15825: instead of 0.2 cm$^3$ of ethanol (paragraph 6.2), 0.85 cm$^3$ of ethanol (paragraph 6.2) is injected.

Supplementation to paragraph 10.3 of Standard ISO 15825: exactly 15 cm$^3$ of spinning liquid (paragraph 6.5) are injected. Subsequently, 0.15 cm$^3$ of ethanol (paragraph 6.2) is injected.

The instruction in paragraph 10.4 of Standard ISO 15825 is entirely inapplicable.

Supplementation to paragraph 10.7 of Standard ISO 15825: immediately after the start of data recording, the spinning liquid in the centrifuge is blanketed with 0.1 cm$^3$ of dodecane (paragraph 6.4).

Supplementation to paragraph 10.10 of Standard ISO 15825: in the case that the measured curve does not reach the baseline again within one hour, the measurement is conducted until the measured curve reaches the baseline again. When, however, the measured curve runs tight to the baseline parallel to the baseline, the measurement is ended after 10 minutes with a parallel course of measured curve and baseline.

Supplementation to paragraph 10.11 of Standard ISO 15825: instead of the method described in the instructions for determining the measurement temperature, the measurement temperature T which should be introduced into the computer program is determined as follows:

$T=2/3(Te-Ta)+Ta$, where Ta denotes the temperature of the measurement chamber upstream of the measurement and Te the temperature of the measurement chamber downstream of the measurement. The temperature difference should not exceed 4° C.

The carbon black can be precompressed. The bulk density (DIN 53600) of the carbon black may vary between 0.03 and 1 kg/l, preferably between 0.05 and 0.5 kg/l.

The carbon black may be granulated. The granulated carbon black may be wet-granulated, dry-granulated, oil-granulated and/or wax-granulated.

The granulation liquids used may be water, silanes or hydrocarbons, for example gasoline or cyclohexane, with or without addition of binders, for example molasses, sugar, lignosulfonates, and numerous other substances alone or in combination with one another.

The granule may be present in the particle size range (ASTM D 1511) between 0.1 μm and 5 mm, preferably between 50 μm and 5 mm.

The carbon black used may also be carbon black mixtures.

The process according to the invention can be carried out without a vibration source.

The process according to the invention can be carried out without a stirrer.

The process according to the invention can be carried out without a fluidizing agent.

The process according to the invention can be carried out with a fluidizing agent. The fluidizing agents used may be pyrogenic silica, hydrophobized pyrogenic silica, pyrogenic mixed oxide or pyrogenic aluminum oxide.

The pyrogenic silica used may be Aerosil 90, Aerosil 200, Aerosil OX 50 or Aerosil 300, the hydrophobized pyrogenic silica used may be Aerosil R 8200, Aerosil R 202 or Aerosil R 972, the pyrogenic mixed oxides used may be Aerosil MOX 80 or Aerosil MOX 170, and the pyrogenic aluminum oxide used may be Aluminiumoxid C from Evonik Degussa GmbH.

The fluidizing agent may be used in amounts of 0.1 to 10% by weight, preferably 0.5 to 2% by weight, based on the carbon black.

The fluidizing agent can be mixed with the carbon black in the fluidized bed or be introduced premixed into the fluidized bed.

The process according to the invention can be carried out without a fluidizing agent, vibration source and stirrer.

The aftertreatment agent may be an oxidizing agent, desiccant or extractant.

The oxidizing agents used may be air, oxygen, ozone, nitrogen oxides, hydrogen peroxide and other oxidizing gases or vapors.

The extractants used may be air, inert gases, for example nitrogen, steam or air/steam mixtures. The extractant can remove adsorbed compounds from the carbon black.

The aftertreatment agent may be a reactive gas, for example ammonia, sulfur trioxide, phosphine, chlorine or hydrocyanic acid.

The aftertreatment may be a drying.

The drying can be effected by means of predried gases. The predried gases may be heated. The predried gases may be air, nitrogen, argon or combustion gases, for example incinerated tail gas from the carbon black process.

For the drying, the apparatus used may be heated externally.

The aftertreatment may be an activation of the surface by means of temperature or a combination of temperature and, for example, steam.

The aftertreatment may be a chemical gas phase deposition (chemical vapor deposition), which is effected in the fluidized bed.

The aftertreatment agent can be introduced into the fluidized bed via the carrier gas stream, via the additional gas stream or via a combination of the two. The aftertreatment agent can be introduced via an additional feed site.

The aftertreatment can be carried out at temperatures of 0° C. to 1200° C.

When the aftertreatment agent used is ozone, the temperature may preferably be 10° C. to 100° C.

When the aftertreatment agent used is $NO_x$, the temperature is preferably 100° C. to 300° C.

When the aftertreatment agent used is air/steam, the temperature may preferably be 300° C. to 600° C.

When the aftertreatment agent used is steam, the temperature may preferably be 800° C. to 1100° C.

The mean residence time of the carbon black in the fluidized bed apparatus may be 1 minute to 10 hours, preferably 1 to 5 hours. The amount of aftertreatment agent may be 1 mg/g of carbon black to 10 g/g of carbon black.

The aftertreatment agent may be introduced preheated into the fluidized bed.

The fluidized bed may be operated batchwise or continuously.

The carbon black prepared by the process according to the invention can subsequently be subjected to extractive blowing with, for example, air or nitrogen, in order to remove excess aftertreatment agent. The extractive blowing can be effected within the fluidized bed or outside. The extractive blowing times may be 5 minutes to 10 h, preferably 30 minutes to 2 h. The extractive blowing temperature may be 20° to 300° C., preferably 50° to 200° C.

The aftertreated carbon blacks prepared by the process according to the invention may be used as a filler, reinforcing filler, UV stabilizer, conductive black or pigment. The aftertreated carbon blacks prepared by the process according to the invention may be used in rubber, plastic, printing inks, other inks, inkjet inks, toners, coatings, dyes, paper, bitumen, concrete and other building materials. The aftertreated carbon blacks prepared by the process according to the invention may be employed as a reducing agent in metallurgy.

The aftertreated carbon blacks prepared by the process of the invention may preferably be used as pigment blacks.

The process according to the invention has the advantage that the carbon blacks which are difficult to fluidize, for example furnace blacks, can be aftertreated efficiently in a fluidized bed without addition of fluidizing agents, stirrers, vibration units, external fields or the like. The use of an additional gas stream allows a stable fluidized bed to be obtained.

EXAMPLES

For the examples, the carbon blacks listed in Table 1 are used. Carbon black A is available under the name XPB 171, carbon black B under the name Printex 60 and carbon black C under the name Printex 55, from Evonik Degussa GmbH.

TABLE 1

|  |  | Carbon black | | |
|---|---|---|---|---|
|  |  | Carbon black A | Carbon black B | Carbon black C |
| BET (ASTM D4820) | m$^2$/g | 660 | 115 | 110 |
| DBP (ASTM 2414) | ml/100 g | 102 | 114 | 46 |
| Volatiles 950° C. (DIN 53552) | % by wt. | 2 | 1 | 0.9 |
| pH (DIN EN ISO 787-9 |  | 7.5 | 10 | 9 |

Example 1 (Comparative Example)

600 g of carbon black B are introduced into a fluidized bed apparatus of diameter 15 cm and height 150 cm. The bed is 23 cm high. The carbon black is subjected to a flow of 500 or 1000 l/h of air through a sintered metal base. A stable fluidized bed does not form; instead one or more channels form in the carbon black bed, through which the air flows and carbon black particles are thrown upward in the manner of a volcano at one point. Homogeneous aftertreatment cannot take place.

Example 2

600 g of carbon black B are introduced into a fluidized bed apparatus of diameter 15 cm and height 150 cm. The bed is 23 cm high. The carbon black has a bulk density (DIN 53600) of 148 g/l. The carbon black is subjected to a flow of 500 l/h of air through a sintered metal base. In addition, 500 l/h of air are introduced through a nozzle which is disposed in the middle (counter to the direction of the main gas flow) and 11 cm above the sintered metal base in the bed.

A stable, sometimes slightly effervescent fluidized bed with a clearly visible upper delimitation forms.

The carbon black bed expands from the original height of 23 cm to a fluidized bed of height 123 cm.

The nozzle used is of the Schlick 121 type.

The carbon black introduced has a content of volatile constituents at 950° C. of 1.1%.

The fluidized bed is heated to 150° C. by an electrical heater, and 30 l/h of $NO_2$ are added to the carrier gas supplied. This oxidizes the carbon black. The oxidation is carried out for 70 minutes. To remove the remaining $NO_2$ the carbon black is subjected to extractive blowing after the oxidation for 1 h. During the aftertreatment, in particular at the elevated temperatures, the gas streams are reduced intermittently, in order that no carbon black is discharged from the apparatus. At 180° C., only 250 l/h of carrier gas and 150 l/h of additional gas stream are required.

After the oxidation, the carbon black has a bulk density of 52 g/l and has a degree of oxidation of 3.6% volatile constituents at 950° C.

Example 3 (Comparative Example)

650 g of a carbon black A are introduced into a fluidized bed apparatus of diameter 15 cm and height 150 cm. The bed is 41 cm high. The carbon black is subjected to a flow of 450 or 900 l/h of air through a sintered metal base. A stable fluidized bed is not formed; instead dust is flung upward in an irregular manner. Homogeneous aftertreatment cannot take place.

Example 4

650 g of a carbon black A are introduced into a fluidized bed apparatus of diameter 15 cm and height 150 cm. The bulk density is 90 g/l. The bed is 41 cm high. The carbon black is subjected to a flow of 450 l/h of air through a sintered metal base. In addition, 450 l/h of air are introduced through a nozzle which is disposed in the bed centrally (counter to the direction of the main gas flow) and 11 cm above the base.

A stable fluidized bed with a smooth surface forms.

The carbon black bed expands from the original height of 41 cm to a fluidized bed of height 130 cm.

The nozzle used is of the Schlick 121 type.

The carbon black introduced has a content of volatile constituents at 950° C. of 2%.

In 0.45 m$^3$/h of the overall gas stream, 50 g/m$^3$ of ozone are generated, which leads to the oxidation of the carbon black. After 6.5 h the carbon black has a degree of oxidation of 7.5% volatile constituents at 950° C.

The carbon black heats up with increasing reaction time; the additional gas stream can be reduced intermittently down to 250 l/h.

After the oxidation, the carbon black has a bulk density of 45 g/l.

When the additional gas stream is shut down (at the end of the aftertreatment), the fluidization of the carbon black collapses.

Example 5 (Comparative Example)

60 g of carbon black C are introduced into a fluidized bed apparatus of diameter 8 cm and height 70 cm. The bed is 10 cm high. The carbon black is subjected to a flow of 600 or 900 l/h of air through a polymer braid base. A stable fluidized bed does not form; instead one or more channels form in the carbon black bed, through which the air flows, and carbon black particles are thrown upward in the manner of a volcano at one point.

Example 6

60 g of carbon black C are introduced into a fluidized bed apparatus of diameter 8 cm and height 70 cm. The bed is 10 cm high. The carbon black is subjected to a flow of 600 l/h of dried air through a polymer braid base. In addition, 300 l/h of air are introduced through a nozzle which is disposed in the bed centrally (counter to the direction of the main gas flow) and 5 cm above the fluidization base. A stable, sometimes slightly bubbling fluidized bed forms, with a clearly visible upper delimitation. The carbon black bed expands from the original height of 10 cm to a fluidized bed of height 34 cm. The nozzle used is of the Lechler 212 124 type.

The carbon black initially has a moisture content (ASTM D 1509) of 1.6%. It is flowed through with the abovementioned air for 24 h and the fluidized bed apparatus is heated externally.

After the drying the carbon black has a moisture content of 0.7%.

All references cited herein are fully incorporated by reference. Having now fully described the invention, it will be understood by those of skill in the art that the invention may be practiced within a wide and equivalent range of conditions, parameters and the like, without affecting the spirit or scope of the invention or any embodiment thereof.

What is claimed is:

1. A process for treating carbon black in a fluidized bed apparatus, comprising:
    a) subjecting said carbon black to a main flow of gas flowing in a direction from an inlet region in the lower part of said fluidized bed apparatus to an outlet region in the upper part of said fluidized bed apparatus, wherein:
        i) a carrier gas is introduced in the lower part of said fluidized bed apparatus; and
        ii) an additional gas is also introduced into said fluidized bed apparatus, wherein said additional gas is introduced at an angle of 91° to 180° relative to the direction of the main gas flow of the fluidized bed in a stream counter to the direction of the main gas flow, and wherein it is the introduction of said additional gas that allows a stable fluidized bed to be obtained;
    b) treating said carbon black in said fluidized bed apparatus with a gas aftertreatment agent introduced into the fluidized bed via the carrier gas, the additional gas, via a combination of the two or via an additional feed site.

2. The process of claim 1, wherein said additional gas is introduced at an angle of 160° to 180° relative to the direction of the main gas flow of the fluidized bed and said carbon black is a furnace black.

3. The process of claim 1, wherein said carbon black is selected from the group consisting of: furnace black; gas black; channel black; lamp black; thermal black; acetylene black; plasma black; Si-containing black; metal-containing black; light-arc black; and inversion black and wherein said aftertreatment agent is introduced into the fluidized bed via the carrier gas stream, via a combination of the carrier gas stream and the additional gas stream or via an additional feed site.

4. The process of claim 1, wherein said process is carried out in the absence of a fluidizing agent, a stirrer or a vibration generator.

5. The process of claim 1, wherein, in step b), said carbon black is aftertreated with an agent selected from the group consisting of: an oxidizing agent, a desiccant and an extractant.

6. The process of claim 5, wherein excess aftertreatment agent is removed from said carbon black by extractive blowing with air or nitrogen.

7. The process of claim 1, wherein, in step b), said carbon black is aftertreated with an oxidizing agent selected from the group consisting of: ozone and an $NO_x$-containing gas.

8. The process of claim 1, wherein, in step b), said carbon black is aftertreated with an extractant selected from the group consisting of: air and an air/steam mixture.

9. The process of claim 1, wherein the fluidized bed is operated continuously.

10. The process of claim 1, wherein said carrier gas is selected from the group consisting of: air; nitrogen and carbon dioxide.

11. The process of claim 10, wherein said additional gas is selected from the group consisting of: nitrogen; argon; and carbon dioxide.

12. The process of claim 10, wherein said additional gas comprises a gaseous reactive component selected from the group consisting of: hydrogen; oxygen; halogens; nitrogen oxides; silanes; formic acid; sulfur oxides and evaporated liquids.

13. The process of claim 12, wherein said additional gas comprises 5-60% by volume of the total gas present.

14. The process of claim 13, wherein said additional gas comprises 25-35% by volume of the total gas present.

15. The process of claim 13, wherein said additional gas stream is pulsed with a pulse duration of 1 second to 15 minutes.

16. The process of claim 15, wherein said pulse duration is 10 seconds to 1 minute.

17. The process of claim 16, wherein said process is carried out in the presence of a fluidizing agent.

18. The process of claim 17, wherein said fluidizing agent is selected from the group consisting of: pyrogenic silica; hydrophobized pyrogenic silica; a pyrogenic mixed oxide; and pyrogenic aluminum oxide.

19. The process of claim 16, wherein said process is carried without fluidizing agents.

* * * * *